Patented Apr. 21, 1942

2,280,710

UNITED STATES PATENT OFFICE 2,280,710

ISOMERIZATION PROCESS

Charles S. Lynch, Fanwood, N. J., assignor to Standard Oil Development Company, a corporation of Delaware No Drawing. Application August 31, 1939,
Serial No. 292,838

10 Claims. (Cl. 260—676)

The process of the present invention relates to the production of iso- or branched chain hydrocarbons from normal or straight chain hydrocarbons.

It is known that hydrocarbons, in particular, the straight chain paraffins, may be isomerized in the presence of various catalysts, such as aluminum chloride, aluminum bromide, molybdenum trisulfide, ferric chloride, zinc chloride, and the like, with or without promoters, into hydrocarbons of different physical and chemical properties, for example, the branched chain paraffins. It is also known that this reaction is reversible and that theoretical yields of the desired isomer are seldom, if ever, obtained.

There are several factors which govern the rate of conversion of normal paraffins into isoparaffins, for example, the catalyst activity often determines the extent to which this isomerization reaction occurs in a given time. Likewise, the temperature at which the reaction is carried out determines to a large extent the rate at which, and the extent to which the normal paraffin is converted into the isoparaffin. When using aluminum chloride as the catalyst, the percentage of promoter added to the catalyst or to the feed stock, as the case may be, is also determinative of the degree of conversion as well as the rate of conversion. Thus, for example, when normal butane is isomerized into isobutane, temperature, percentage of promoter present, amount of catalyst present, relative activity of that catalyst, etc. are each important factors in determining not only the ultimate percentage of conversion but the rate at which that conversion is attained. When isomerizing normal butane, it has been found that high temperatures, say of the order of 300° F. to 400° F., are excellent when considering the rate of conversion or conversion per pass since these temperatures promote a fairly rapid rate of conversion. However, from another standpoint, namely percentage of conversion or yield of isomeric butanes, such temperatures are distinctly detrimental to an ultimate high yield of the desired product, namely, isobutane, by reason of the fact that considerable amounts of products of degradation or cracking are produced and these by-products materially affect the catalyst activity and ultimate yield of isomers. On the other hand, if the temperature is lowered, to between about 100 and about 175° F., in many respects the process proves impractical for the reason that in order to convert any substantial amount of butane into the corresponding isobutane, an undesirably long period is required for the reaction to attain anything like a fair degree of completion. In other words, the reaction does not approach equilibrium with sufficient speed to make such a process commercially feasible.

It is an object of the present invention to carry out the isomerization of normal paraffinic hydrocarbons in a minimum time to produce isomers thereof having branched structure in such a manner and under such conditions that the yields of the desired isomers are as high as is practically and economically possible to attain. The conditions necessary to accomplish such results will be more fully hereinafter described.

It is a further object of this invention to carry out such a process in the liquid phase and to so correlate the temperatures, rates of thruput, quantity of catalyst and promoter with the temperatures and times required to accomplish the desired results either in a single reactor or a series of reactors so that it is possible to attain a maximum degree of conversion to the desired branched chain paraffins without sacrificing to any large extent either the rate of conversion or the amount of conversion.

To accomplish these objects, as well as other objects, which will be apparent from a full understanding of the invention to be more fully hereinafter described, it has now been found that excellent yields of the desired isomeric hydrocarbons, in particular iso- or branched chain paraffins of four or more carbon atoms per molecule, may be obtained by employing a series of two or more reaction stages and by maintaining a temperature gradient between each of these stages, the highest temperature usually being maintained in that reactor to which the fresh feed is initially admitted. If desired, however, where more than two reactors in series are employed, the highest temperature may be maintained in the second or some succeeding reactor, preferably, however, not the last. The feed stock, comprising normal paraffinic hydrocarbons in substantially pure state or in admixture with minor amounts of naphthenes and/or branched chain paraffinic hydrocarbons, for example, straight run naphtha, field butanes, etc., is contacted with an isomerization catalyst at a temperature between about 250 and about 350° F. for between about 0.5 and about 4 hours, depending upon the catalyst concentration and, if used, the concentration of promoter employed. The effluent from the initial reactor is then cooled and introduced into a second reactor maintained at a somewhat lower temperature, for example, between about 175 and about 250° F. and in which additional catalyst, and if expedient, additional promoter, is maintained. The time of contact in this reactor depends, among other things, upon the catalyst concentration, promoter concentration, if any promoter is employed, and the temperature. The effluent from the second reactor or stage of reaction is then introduced at a lower temperature, namely, between about 32 and about 175° F. and contacted with further quantities of an isomerization catalyst, which is not necessarily, although it usually is, the same catalyst as that employed in the preceding stages of the reaction. The time of contact will depend upon the catalyst employed, its concentration, and, if a promoter is used, its concentration. If the requirements of any particular feed stock demand it, further stages of reaction may be set up, in which case the temperatures maintained on each of the reactors or the variation of the temperature on a batch type reactor, that is, a single reactor, will be readily adjusted in accordance with principles of the invention herein outlined. By employing a process of isomerization embodying the principles herein set forth, it is readily possible to attain a concentration of isomeric products approaching equilibrium concentrations in minimum time from the economic standpoint and with a substantial absence of degradation products of lower and higher molecular weight than the hydrocarbons of the feed stock.

The process is applicable to the treatment of normal butane, normal pentane, normal hexane, normal heptane, normal octane, and the corresponding higher homologues of the paraffin series. It is within the scope of the present invention to also employ mixtures of paraffinic hydrocarbons, such as normal butane and normal pentane, or mixtures embodying three or more members of the straight chain paraffinic series. Likewise, the invention is applicable to the treatment of straight run naphthas of relatively low octane number which are predominantly composed of normal paraffinic hydrocarbons. Such isomerization treatment materially increases the octane number of such feed stocks. The invention is likewise applicable to the treatment of field butanes, paraffinic mixtures resulting from the removal of olefinic constituents of refinery $C_4$ cuts or $C_5$ cuts, waste gases of paraffinic nature evolved from thermal and/or catalytic alkylation and polymerization units, normal alkyl naphthenes, and other similar types of essentially normal paraffinic hydrocarbons.

Temperatures of between about 32° F. and about 350° F. may be employed depending upon the feed stock, upon the length of time of contact of the feed stock with the catalyst, and the duration of the heating applied to that feed stock. However, as has been explained and, as will be more fully hereinafter explained, the heat treatment under which the reaction is carried out is very carefully controlled and correlated with other factors entering into the operation of the present invention.

The process of the present invention may be carried out in either the liquid or the vapor phase. However, for most economical operation it has been found that the present process is preferably carried out in the liquid phase. Sufficient super-atmospheric pressure should therefore be employed in order to maintain the hydrocarbon reactants in the liquid phase under the conditions of operation obtaining.

Any suitable isomerization catalyst may be employed for carrying out the above described reaction. Aluminum bromide and aluminum chloride and other metal halides are specifically suggested for use in this reaction. Where aluminum chloride is used as the catalyst, it is desirable to add to the reaction, either to the feed stock as it enters the reaction chamber or to the catalyst within the reaction chamber, a promoter such as water, hydrogen chloride, hydrogen bromide, alkyl halides such as ethyl chloride or butyl chloride, lower aliphatic alcohols, for example, butyl alcohol, akyl esters, or the like. Where possible, in using aluminum bromide, it should be freshly sublimed. In the case of aluminum chloride, not only is freshly sublimed aluminum chloride desirable, but finely divided aluminum chloride materially increases the rate of reaction.

As heretofore mentioned, two or more different types of catalysts may be simultaneously employed in a series of reactors. For example, aluminum bromide may be used initially, i. e., in the first reactor or in that reactor operated at the highest temperatures, whereas the reactors operating at the lower temperatures may be used with $AlCl_3$ plus a promoter, such as a hydrogen halide. In some instances there are distinct advantages flowing from such an operation, particularly in isomerizing the saturated low octane number naphthas. In order to attain further improved results, it is preferred that the reaction mixture be vigorously agitated so as to obtain intimate contact of the catalyst with the reactants, particularly in liquid phase operation. Any suitable method for agitation may be employed, such as, for example, jets of restricted internal diameter whereby the liquid feed stock is forced thru the jets into the catalyst chamber containing a relatively large amount of catalyst, turbo mixers, centrifuges, mechanical stirrers, and the like.

In order to attain the results disclosed by operating according to the process of the present invention, it is necessary to have present only a minimum amount of catalyst, although materially increased quantities of catalyst are distinctly beneficial to the smooth operation of the process. In general, the amount of catalyst present constitutes between about 5 and about 25% of the total reaction mixture present in a single isomerization chamber at any one time.

No special apparatus is required for the successful carrying out of the present process. The process of the present invention may be successfully carried out using a single batch type operation in which the entire treatment of the hydrocarbon, for example, normal butane, is carried out in a single pressure vessel equipped with some means for mechanical agitation and means for gradually lowering the temperature as the reaction progresses. On the other hand, in large commercial plants, it is preferable to employ a series of time tanks or pressure vessels connected in series wherein the feed stock is preheated to the required temperature introduced into the first reactor where it is contacted with the catalyst and promoter, if desired, for the required length of time, conducted from this chamber to a second chamber of similar design with optional intermediate cooling of the partially isomerized feed stock where it is contacted with further quantities of an isomerization catalyst at the lower temperature for the required length of time, conducted from the second isomerization chamber to a cooling unit where it is further cooled to a lower temperature and then conducted into a third isomerization unit containing additional amounts of such a catalyst, etc. until the required degree of isomerization has been attained. In a process employing a single autoclave or pressure vessel as the isomerization reactor, means should be provided for not only preheating the feed to the highest temperature required, but means should also be provided for cooling the reaction chamber to the desired successive reductions in temperature as will be more fully hereinafter explained.

Whether the process is run as a batch operation or as a continuous operation, the effluent from the final isomerization reactor is conducted into a separating unit which may consist of a centrifuge, a rotary type filter, for example, a "Cuno" filter, a drum and blade type filter, a plate and frame press type filter, or the like, to free the product from the catalyst. The filtrate may then be subjected to fractional distillation in a bubble tower of the required number of plates. For separating iso- from normal butane, about a 50 plate tower would be required. The precipitate of aluminum chloride, or the like, as well as the unreacted normal butane which has been separated by the fractionation, may be returned to the reaction zones as required.

In isomerizing normal butane to isobutane in the presence of aluminum chloride and hydrogen chloride in the liquid phase with intensive agitation, it is possible to obtain about 80% conversion of the normal butane to isobutane without any cracking of the $C_4$ molecule if temperatures of the order of 100° F. are employed. However, in order to attain such a yield of isobutane under these conditions, several days, or even weeks, of contact of the normal butane with the catalyst is required. Likewise, when carrying the reaction out at around 200° F., it is possible to obtain a conversion of normal butane to isobutane of about 75% with substantially no cracking taking place. However, the time required to attain such a conversion is materially less than in the case where 100° F. was employed as the reaction temperature. On the other hand, when employing a temperature of around 300° F. to 350° F., it is possible to attain only about 65% isobutane, but in this latter instance there is a material amount of cracking occurring although the reaction goes to substantial completion, in other words, reaches substantial equilibrium in a few hours.

The following tabulated data are presented as illustrations of the effect the various variables have on the ultimate yield of isobutane from normal butane.

Table

|   | $AlCl_3$ | HCl | Temp. | Yield of isobutane | Time |
|---|---|---|---|---|---|
|   | Percent | Percent | °F. | Percent | Hours |
| 1 | 10 | 2 | 275 | 50 | 1.5 |
| 2 | 10 | 2 | 250 | 50 | 2.0 |
| 3 | 10 | 2 | 200 | 50 | 7.5 |
| 4 | 10 | 2 | 150 | 50 | 25.0 |
| 5 | 10 | 2 | 275 | 70 | 3.5 |
| 6 | 10 | 2 | 250 | 70 | 4.5 |
| 7 | 10 | 2 | 200 | 70 | 15.0 |
| 8 | 10 | 2 | 150 | 70 | 70.0 |
| 9 | 50 | 4 | 200 | 37 | 2.0 |
| 10 | 50 | 10 | 200 | 53 | 2.0 |
| 11 | 50 | 17 | 200 | 60 | 2.0 |
| 12 | 5 | 2 | 200 | 35 | 10.0 |
| 13 | 10 | 2 | 200 | 57 | 10.0 |

From the data presented in the table it will be readily understood that for attaining a maximum conversion the lower temperatures are not particularly suitable from a commercial standpoint, for the reason that the length of time involved in order to attain such a conversion becomes a material factor in operating such a commercial unit. On the other hand, the use of higher temperatures, as has been heretofore pointed out, while reducing the contact time required for attaining a maximum conversion, results in substantial amounts of cracking of the normal paraffins fed to the isomerization unit accompanied by rapid catalyst degradation when cracking occurs. A feature of the present invention is to initially operate at a fairly high temperature and to gradually and continuously drop the temperature as the reaction proceeds toward equilibrium or to employ a fairly high temperature and in a step-wise manner lower the temperature at intervals to accomplish the same result. As has been heretofore illustrated, two or three separate reactors interconnected may be employed maintaining each reactor at a substantially lower temperature than the preceding one. The invention is not limited to any specific number of reactors since it is well within the skill of those operating such units to employ 3, 4, 5, 6, or more such reactors, depending upon the degree of control which it is desired to maintain over the rate of isomerization.

In order to more fully understand the process of the present invention, the following examples are given:

Example 1

20% aluminum chloride mixed with 10% hydrogen chloride, based on the normal butane fed to the isomerization unit, was maintained at 200° F. for 3 hrs. in order to obtain a 70% conversion and at the same time to avoid substantial cracking. Normal butane may be subjected to 200° F. for 1½ hours to obtain a 50% conversion and for an additional 1½ hours at the same temperature to increase the conversion from 50% to 70%. Employing the same catalyst composition and promoter in the same quantities but employing a temperature of 250° F., it was found that in 20 minutes isobutane was formed in the amount of a 50% conversion without excessive cracking taking place. However, under these conditions, it was not possible to attain a 70% conversion due to cracking conditions yet it required only 20 minutes to attain a 50% conversion.

According to the invention, the isomerization of normal butane to an original conversion of about 50% at a temperature of about 250° F. is effected and the resultant mixture is subjected to the isomerization reaction at 200° F. to attain the ultimate 70% conversion, but without deleterious side reactions. It will therefore be readily understood that the same degree of conversion can be attained in an overall elapsed time of 110 minutes by such a procedure in contrast to obtaining the same yield at 200° F. using a total elapsed time of 180 minutes and with the added advantage that substantially no cracking occurs when using the improved method. By using the two-stage operation of obtaining a high yield without cracking, the catalyst life is materially enhanced and distillation costs, because of the substantial absence of cracked products, are materially lowered.

Example 2

7% of aluminum chloride, 12% hydrogen chloride constitute the catalyst and promoter employed. Normal butane, when contacted with the catalyst in this ratio at 200° F. requires about 18 hours to attain a 70% conversion to isobutane. To attain a 50% conversion at the same temperature requires about 10 hours. In other words, to increase the yield of isobutane from 50% to 70% requires about 8 hours. On the other hand, when operating at 250° F. to attain a 70% conversion requires about seven hours with some cracking taking place. Operating at the same temperature, a 50% conversion can be attained in about 2 hours with practically no cracking occurring.

The process of the present invention lies in carrying out the present reaction for 2 hours at a temperature of about 250° F. in order to attain about a 50% conversion and for an additional 8 hours at a lower temperature of, for example, about 200° F., to obtain an ultimate yield of about 70% of isobutane by weight based on the normal butane fed to the reaction zones. This represents a saving of about 8 hours in total time required to effect a 70% conversion without the production of appreciable amounts of by-products and without loss of catalyst activity.

While these examples specifically disclose a two-stage process in which a 50% conversion is attained in the first stage and an additional 20% is attained in the second stage, it is to be distinctly understod that the invention is not limited to this particular specific type of operation. Thus, for example, based upon the data presented herewith, it is quite possible, and at times highly desirable, to operate a 3, 4, or even 5-stage operation in which 300° F. may be employed as the initial temperature of isomerization, yielding, for example, only a 20% or 30% conversion, subsequently isomerizing the same reaction mixture at a temperature of around 250° F. to attain an additional 20% to 25% conversion followed by a further isomerization treatment at around 200° F. to attain an additional 20% conversion and, if desired, a still further isomerization treatment of the same hydrocarbon mixture at a temperature of about 150° F. to attain a further 10 to 15% conversion. In such a manner, a still further saving of time results, without sacrificing yields of the desired isomers.

If desired, the temperatures of the various isomerization chambers may be maintained constant at, say, for example, 300° F. on the first zone, 250° F. on the second, 200° F. on the third, 100° F. on the fourth and so on, and maintaining any given portion of the reactants in these various stages of isomerization for a specified length of time, for example, 2 hours in each reaction zone or whatever length of time is found best for optimum results. Such an operation readily lends itself for use in a continuous process.

In cases where normal pentanes, normal hexanes, and the like are employed, it is sometimes necessary to operate at lower temperatures in order to prevent substantial amounts of cracking from occurring. However, the principles of the procedure outlined above are equally applicable in such cases. Thus, in the case of normal pentane, operating temperatures should lie somewhere within the range of about 50° F. to about 175° F. The same is true with respect to the isomerization of straight run naphthas composed predominantly of mixtures of normal paraffinic hydrocarbons ranging from normal butane thru normal decane.

The present invention is not intended to be limited to any theory or mechanism of the reaction but only insofar as limited by the following claims in which it is desired to claim all novelty inherent in the invention. The nature and objects of the present invention having been thus fully described and illustrated, what is new and useful and is desired to be secured by Letters Patent is:

1. A process which comprises contacting at least one normal paraffin containing at least four carbon atoms per molecule with a metal halide isomerization catalyst of the Friedel-Crafts type under isomerization conditions in a step-wise process, carrying out the reaction in at least two stages, maintaining a temperature gradient between the stages, the last stage being maintained below the temperature employed in at least one other stage and correlating the temperature of any particular stage with the length of time the feed is subjected to that temperature so as to avoid substantial cracking of the paraffins and products obtained while effecting substantial isomerization of the normal paraffins.

2. A process which comprises flowing a hydrocarbon feed stock containing at least one normal paraffin containing at least four carbon atoms per molecule, said feed stock being composed predominantly of straight chain paraffins through at least two isomerization zones arranged in series containing at least one metal halide of the Friedel-Crafts type and a promoter of the type R.halide wherein R is one of the group consisting of hydrogen and lower alkyl in each isomerization zone, while maintaining a temperature gradient between the zones, all temperatures being between about 32 and about 350° F., with the temperature employed in the final isomerization zone being substantially below the temperature maintained in at least one other zone and wherein the time of contact of the hydrocarbon feed in the various isomerization zones is adjusted to avoid substantial cracking of the feed and products formed throughout the duration of the treatment, yet is of sufficient length to accomplish substantial isomerization in each zone.

3. A process of catalytically converting paraffins of at least four carbon atoms per molecule into more highly branched paraffins of substantially the same number of carbon atoms per molecule which comprises flowing the hypdrocarbons and a catalyst promoter of the type R.halide wherein R is one of the group consisting of hydrogen and lower alkyl into intermittent contact with at least one metal halide isomerization catalyst of the Friedel-Crafts type in a continuous process involving a series of isomerization reactors each containing an isomerization catalyst, each reactor being maintained at a higher temperature than the succeeding reactor, the temperatures thereby being decreased as the isomerization of the hydrocarbon feed fed to the system and passing thru the system proceeds, the length of contact of the feed with the catalyst in any one reactor being short enough to avoid substantial cracking of the hydrocarbons present yet of sufficient length to accomplish substantial isomerization in each reactor.

4. A process as in claim 3 wherein the metal halide isomerization catalyst is aluminum bromide.

5. A process for isomerizing normal butane to isobutane which comprises heating normal butane with between about 5 and about 50% by weight of aluminum chloride in the presence of between about 2 and about 20% of hydrogen chloride under a pressure sufficient to maintain the reactants in the liquid phase, the temperature of the reaction being maintained at between about 250° F. and about 350° F. for between about ½ and about 4 hours, between about 175° F. and about 250° F. for between about 5 and about 10 hours and between about 32° F. and about 175° F. for between about 8 and about 20 hours, the length of contact of the hydrocarbons with the catalyst under any one set of temperature conditions being insufficient to effect substantial cracking of the hydrocarbons yet of sufficient length to accomplish substantial isomerization under each of the temperatures employed.

6. A process as in claim 5 wherein the process is carried out continuously.

7. A process for isomerizing normal butane to isobutane which comprises contacting about 20% aluminum chloride and about 10% hydrogen chloride with normal butane at a temperature of about 250° F. for about 0.33 hour and lowering the temperature to and maintaining the same at about 200° F. for about 1.5 hours additional time.

8. A process for isomerizing normal butane to isobutane which comprises contacting about 7% aluminum chloride and about 12% hydrogen chloride with normal butane at about 250° F. for about 2 hours and lowering the temperature to and maintaining the same at about 200° F. for about 8 hours additional time.

9. A process for the conversion of normal pentane to isopentane which comprises contacting normal pentane with between about 2 and about 100% aluminum chloride and between about 0 and about 50% hydrogen chloride at successively diminishing temperature gradients of between about 175 and about 200° F. to between about 125° F. and about 175° F. then between about 75° F. and about 125° F. and finally to between about 50° F. and about 75° F., the length of contact of the hydrocarbons with the catalyst and promoter under any one set of temperatures being insufficient to effect substantial cracking of the hydrocarbons yet of sufficient length to effect substantial isomerization of normal pentane to isopentane.

10. A process which comprises contacting a naphtha of relatively low octane number and composed predominantly of paraffins with an aluminum halide at temperatures known to eventually induce mild cracking of the naphtha upon extended contact of said naphtha at said temperatures, successively lowering said temperature prior to the effecting of any substantial degree of cracking by a series of step-wise operations as the isomerization reaction proceeds and finally distilling from the reaction mixture a naphtha of improved octane number.

CHARLES S. LYNCH.